Patented Sept. 29, 1936

2,055,875

UNITED STATES PATENT OFFICE 2,055,875

TREATMENT OF HYDROCARBONS

Jacque C. Morrell, Chicago, Ill., assignor to Universal Oil Products Company, Chicago, Ill., a corporation of Delaware No Drawing. Application June 14, 1934,
Serial No. 730,552

3 Claims. (Cl. 196—10)

This invention relates more particularly to the treatment of olefinic hydrocarbons which are normally gaseous at ordinary temperatures and pressures.

Thus, it is concerned with gaseous olefin hydrocarbons which occur along with corresponding paraffinic or saturated hydrocarbons in commercial hydrocarbon mixtures such as those encountered in the cracking of petroleum, in gas making processes and as by-products in various chemical industries. In general, they are more chemically active than other classes of hydrocarbons, particularly if they contain more than one double bond or triple bonds between carbon atoms. Even when under mild catalytic influence they exhibit this reactivity in their pronounced tendency to polymerize and form substances of higher molecular weight.

Olefins occur in particularly large percentages in the fixed gases from cracking processes as well as in the gasoline boiling range fractions. The fixed gases are utilized principally as fuel, only a very small percentage of present day commercial production being subjected to processes for the recovery or utilization of the olefinic constituents. The manufacture of secondary alcohols such as iso-propyl alcohol and others by first absorbing the corresponding olefins in cracked gases in sulphuric acid and then hydrolyzing the acid esters has been undertaken to a limited extent. The olefins present in cracked hydrocarbon mixtures of gasoline boiling range are of moderately high anti-knock value, but a certain percentage of these is too highly unsaturated, and these must be removed by chemical treatment, usually with sulphuric acid, to insure proper stability of the gasoline under storage conditions.

The present process provides for more effectively utilizing the olefinic constituents of commercial hydrocarbon mixtures, particularly those occurring in the gases from oil cracking processes to produce valuable derivatives therefrom and it may also be applied to individual olefins produced by special chemical methods or by fractionation of mixtures.

In one specific embodiment the invention comprises treatment of normally gaseous olefin hydrocarbons at elevated temperatures with hydrochloric acid and metals, to produce polymers therefrom utilizable as constituents of motor fuel.

The process of the present invention is particularly directed to the production of dimers and trimers from mono-olefins, particularly those whose lower polymers boil at temperatures within the approximate range of commercial motor fuel, say, for example, from 100 to 400° F. The following table shows the approximate boiling points of the dimers of propylene, butylenes, amylenes and hexylenes which will occur in appreciable quantities in the gases from oil cracking processes. The boiling points given are average for the various isomers possible corresponding to each compound. These polymers have unusually high anti-knock characteristics:

*Boiling points of olefin dimers*

| | Degrees Fahrenheit |
|---|---|
| Hexylene (dimer of propylene) | 155 |
| Octylene (dimers of butylenes) | 255 |
| Decylene (dimers of amylenes) | 323 |
| Dodecylene (dimers of hexylenes) | 417 |

Polymers of higher molecular weight than the di- and tri-molecular compounds are generally of too high boiling point to be used in commercial gasolines and the end products of further polymerization approach the character of resinous pitchy solids which are entirely unsuitable.

Of the lower boiling olefins which are normally gaseous ethylene is ordinarily the most resistant to polymerization when using such catalysts as aluminum chloride, sulfuric acid, phosphoric acid, etcetera. With these catalysts ethylene exhibits a tendency to form addition complexes or acid esters which are stable and which do not catalyze the polymerization of further quantities of ethylene. In the present process, however, in which hydrochloric acid in contact with metals is employed to catalyze the reactions of polymerization among the olefins in hydrocarbon gas mixtures, it is evident that the polymerization of ethylene is definitely accomplished and that further condensation or mixed polymerization reactions occur between ethylene and its immediately higher homologs such as propylene and the butylenes. This feature is apparently quite distinctive to the present process.

In regard to the metals which may be employed as solid contact materials the heavier metals are preferred, particularly those above hydrogen in the electrochemical series such as, for example, aluminum, manganese, zinc, chromium, cadmium, tin, iron, nickel and cobalt. However, electronegative metals may also be employed in conjunction with the electropositive variety either in mechanical admixture or in alloyed condition. It is to be understood that each metal or combination of metals which may be employed alternatively will have a specific and characteristic influence upon the reactions of polymerization among the olefins in any given gas mixture so that they are not to be looked upon as being precisely equivalent in their effect.

The term "hydrochloric acid" as used in the present connection is intended to include aqueous solutions of hydrogen chloride or mixtures of hydrogen chloride and water vapor, since the efficiency of the polymerizing reactions seems to depend upon the presence of at least minor amounts of water. Thus, in practice either aqueous solutions of the acid may be injected into the reaction zone or hydrogen chloride and steam or water may be introduced separately in regulated proportions.

It is a feature of the present process that the preferred polymerizing catalytic materials have a relatively mild and selective action so that reactions of polymerization among olefins of higher molecular weight than ethylene are substantially limited to the formation of compounds utilizable as constituents of motor fuel and there is a minimum production of gummy or resinous polymers and liquid hydrocarbons boiling above the end point of commercial gasoline. These results are novel and in contrast to those obtained when using more vigorous polymerizing agents such as, for example, sulphuric and phosphoric acids and mixtures thereof, aluminum chloride, etcetera, under conditions most favorable for their catalytic action. Using the older types of catalysts requires careful choice and regulation of operating conditions to prevent undesirable side reactions.

It is a further feature of the present invention that moderate temperatures are sufficient, including those from normal atmospheric up to but not generally exceeding 400° F., depending upon the character and percentage of the olefins present in the gas mixture being processed. Experiments have shown that higher overall economies may be effected when operating with the present type of catalyst under relatively mild temperature conditions when the yield of motor fuel boiling range products and their anti-knock value is considered.

Operating procedure when treating olefin-containing gases according to the present process is simple and consists merely in adding small amounts of hydrochloric acid usually of the order of from 1 to 5% by weight of the gases, heating to an optimum temperature determined by small scale tests and passing the gaseous mixture through stationary beds of metals, metal mixtures or metal alloys in the form of grains or turnings. As a rule, downflow over such contact masses is preferred on account of the washing effect of the gas stream which tends in effect to keep the metal surfaces free from any reaction products between the hydrochloric acid and the metals such as metal chlorides and from any liquid products which may be of sufficiently high boiling point to condense in the treater. After passing over the catalyst bed the mixture of gases and vapors is cooled by passage through condensing coils, the fixed gases separated from the condensed liquids and treated if desired for recovery of the hydrochloric acid which is normally only consumed, to a small extent in the formation of some metal chlorides and to a correspondingly small extent in addition reactions with the original gaseous olefins or their polymers.

The following example shows one instance of results obtained when treating a mixture of olefin-containing hydrocarbon gases according to the present process. The data given is quite characteristic of results which are commonly obtainable but the invention is not correspondingly limited.

A gaseous mixture comprising the stabilizer reflux from a plant operating upon cracked distillate was utilized as the charging material. This gas contained from 25 to 30% of 3, 4 and 5 carbon atom olefins approximately 60% of which were propylene and the remainder various butylenes and amylenes. This gas mixture was heated to a temperature of 375° F. under a pressure of approximately 100 pounds per square inch in a tubular heating element, an amount of 20% aqueous hydrochloric acid equal to about 2% by weight of the total gas mixture was injected into the heated gases and the mixture was then passed downwardly through a mass of brass turnings contained in a vertical cylindrical treating tower.

The exit gas mixture was treated with ammonia to eliminate the remaining hydrochloric acid as ammonium chloride. The gases were cooled by a tubular condenser of ordinary construction and the liquid polymers having the properties shown in the following table were separated from the fixed gases and washed with caustic soda to insure their neutrality. The yield of polymers was 5 gallons for each 1,000 cubic feet of gas mixture treated:

*Properties of liquid polymers*

| | |
|---|---|
| Gravity, ° A. P. I | 64 |
| Initial boiling point, °F | 98 |
| 50% over at | 255 |
| 90% over at | 435 |
| End boiling point | 465 |
| Color, Saybolt | 28 |
| Mg. gum by copper dish | 30 |
| Blending octane number, motor method | 95 |

A careful fractionation with steam of the above liquid polymers yielded a 400° F. end point material with a blending octane number of 105 which was suitable for mixing with any type of low anti-knock motor fuel for increasing its commercial value.

The preceding specification and single example are sufficient for making clear the character and commercial importance of the present invention although neither is to be construed in the light of imposing exactly corresponding limitations upon its generally broad scope.

I claim as my invention:

1. A process for the treatment of gaseous olefinic hydrocarbons to produce liquid hydrocarbons therefrom suitable for high antiknock motor fuel or blending agent therefor which comprises, subjecting the said gaseous olefinic hydrocarbons at elevated temperature to the action of aqueous hydrogen chloride and a metal capable of reacting with hydrochloric acid and liberating hydrogen therefrom, and controlling the operating conditions to polymerize the gaseous olefins predominantly into gasoline boiling hydrocarbons.

2. A process for the treatment of gaseous olefinic hydrocarbons to produce liquid hydrocarbons therefrom suitable for high antiknock motor fuel or blending agent therefor which comprises, subjecting the said gaseous olefinic hydrocarbons at elevated temperature to the action of aqueous hydrogen chloride and a metal comprising zinc, and controlling the operating conditions to polymerize the gaseous olefins predominantly into gasoline boiling hydrocarbons.

3. A process for the treatment of gaseous olefinic hydrocarbons to produce liquid hydrocarbons therefrom suitable for high antiknock motor fuel or blending agent therefor which comprises, subjecting the said gaseous olefinic hydrocarbons at elevated temperature to the action of aqueous hydrogen chloride and a metal comprising brass, and controlling the operating conditions to polymerize the gaseous olefins predominantly into gasoline boiling hydrocarbons.

JACQUE C. MORRELL.